Dec. 2, 1924.
S. H. PERKY
FOOD PRODUCT AND PROCESS OF MAKING SAME
Filed Sept. 30, 1920
1,517,453
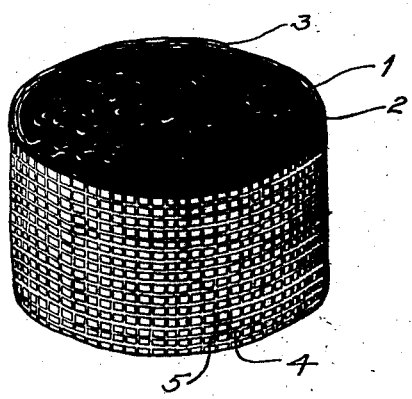
Inventor
Scott H. Perky
By
John W. Perky
Attorney Patented Dec. 2, 1924.

1,517,453

UNITED STATES PATENT OFFICE.

SCOTT H. PERKY, OF KEESEVILLE, NEW YORK.

FOOD PRODUCT AND PROCESS OF MAKING SAME.

Application filed September 30, 1920. Serial No. 413,812.

*To all whom it may concern:*

Be it known, that I, SCOTT H. PERKY, a citizen of the United States, residing at Keeseville, in the county of Essex and State of New York, have invented certain new and useful Improvements in Food Products and Processes of Making Same; and I do hereby declare the following to be a full, clear, and exact description of the invention, such as will enable others skilled in the art to which it appertains to make and use the same.

My invention relates to food products and process of making same.

Among the objects of my invention are:

To devise a process for producing a new food product which shall be pleasing and appetizing in appearance; which shall be of such a texture that it can be readily masticated and thoroughly permeated by the saliva and other digestants; which shall be of such a texture that it will support without fracture the shocks due to packing and shipping and which shall be of such a texture that all parts of same may be equally dried or baked.

To devise a process for producing a food product having the above characteristics and which, in addition, can be fabricated from a large number of materials at a low cost.

These and other objects and advantages of my invention will appear in the following specification, reference being had to the accompanying drawing, and will be more particularly pointed out in the claims.

The drawing represents a food product formed by my improved process and provided with the central portion 1 which is preferably formed of a plurality of convolutions, of a ribbon that is either corrugated, imbricated, castellated or embossed, or shaped in any manner so that interstices will exist between adjacent convolutions, which interstices may extend unbrokenly from the upper flat surface of the food product to the lower flat surface thereof, or which may be discontinuous between said surfaces. The outer convolutions 2, of which there may be one or any predetermined plurality, are preferably formed so that said convolutions will lie closely together in order to present an approximately smooth surface to abrading forces and thereby in a large measure prevent breakage of the outer layer of my improved product and effectively sustain and contain the inner and more fragile convolutions 1.

The food product may be shaped as shown in the accompanying drawing or it may have any desired shape of ends and any desired shape of lateral bounding surface, whether curved, regular, polygonal or combining salient and re-entrant angles.

In carrying out my improved process to produce a food product such as that just described, I take any approved material and after reducing the same in any approved manner to a plastic condition I pass the same through rolls, or use any suitable device for forming said material in the shape of a ribbon of the desired width and thickness. I then corrugate the beginning of said ribbon and continue said corrugations along a sufficient length of said ribbon to form the portion 1 of my improved food product, and I then discontinue the formation of the corrugations for a sufficient length of said ribbon to form the convolutions 2 of my improved product.

Where I have stated that I have formed corrugations in the ribbon that is to form the portion 1, it is to be understood that any form of embossing such as noted above or any other may be used in lieu of said corrugations.

I then roll the corrugated portion in order to form the convolutions 1 and continue said rolling to wrap the straight convolutions 2 around the corrugated convolutions 1, moistening the end 3 immediately before it is placed in position.

In order to make the material comprising my improved food product still more ornamental, appetizing and permeable by the digestants, I preferably form therein a plurality of striæ 4 and at suitable distances apart, join said striæ together by the bars 5.

I then remove the food product to any suitable support which may be a flat pan and upon which the flat bottom of the food product rests, or it may be a plurality of grooves in which the curved surface of said product rests. In either case, I then remove the food product either to a drying chamber or to a baking oven, depending upon whether the product requires simply drying, or baking, after which the product is to be packed and is ready for shipment.

While I have shown my improved product formed approximately in the shape of a biscuit, it is to be understood that the shape is not of the essence of my invention.

I consider any product having corrugated, imbricated, castellated or otherwise embossed convolutions to be within the scope of my invention, whether said convolutions are surrounded by flat convolutions or not.

Thus it will be seen that I provide a new and superior form of food product capable of safe and sanitary production and shipment, every portion of which is either thoroughly dried or baked so that it will keep in all climates for an indefinite length of time and which is readily permeable by the digestive juices.

In the claims the convolutions shown at 1 will be referred to as corrugated, but it is to be understood that any suitable formation that will provide a plurality of interstices between the inner convolutions is within the scope of my invention.

I have also claimed the ribbon as striated and provided with bars, but it is to be understood that the striæ may be replaced by a lace-like design or any arrangement that will provide a plurality of holes through the body of the ribbon, such as a plurality of filaments.

I also claim the ribbon as rolled into the form of a cylinder but it is to be understood that it may be rolled into other forms without departing from the spirit of my invention.

I claim:—

1. A food product consisting of a plurality of corrugated convolutions.

2. A food product consisting of a plurality of convolutions having interstices therebetween surrounded by convolutions substantially in mutual contact throughout.

3. A food product consisting of a plurality of embossed convolutions having interstices therebetween surrounded by a plurality of unembossed convolutions.

4. A food product consisting of a plurality of convolutions, of corrugated ribbon surrounded by a plurality of convolutions of plain ribbon.

5. A food product consisting of a plurality of convolutions of corrugated ribbon surrounded by a plurality of convolutions of plain ribbon having the end secured.

6. A food product consisting of a striated ribbon rolled into the form of a cylinder and dried or baked.

7. A food product consisting of a striated and barred ribbon rolled into the form of a cylinder and dried or baked.

8. A food product consisting of a striated ribbon corrugated throughout a portion of its length, plain throughout the remainder of its length and rolled into the form of a cylinder having the corrugations on the interior thereof and the plain portion on the exterior thereof.

9. The herein described process of producing a food product which consists in shaping the material in the form of a ribbon and rolling said ribbon into the form of a cylinder having interstices between the successive layers.

10. The herein described process of producing a food product which consists in shaping the material into the form of a ribbon, corrugating a portion of said ribbon, leaving a portion of said ribbon plain and rolling said ribbon into the form of a cylinder having the plain portion thereof on the outside.

11. The herein described process of producing a food product which consists in shaping the material into the form of a ribbon, corrugating a portion of said ribbon, leaving a portion of said ribbon plain, rolling said ribbon into the form of a cylinder having the plain portion thereof on the outside and securing the end of said ribbon.

12. The herein described process of producing a food product which consists in shaping the material into the form of a ribbon, corrugating a portion of said ribbon, leaving a portion of said ribbon plain, rolling said ribbon into the form of a cylinder having the plain portion thereof on the outside, securing the end of said ribbon and afterward drying or baking said cylinder.

13. The herein described process of producing a food product which consists in shaping the material into the form of a striated ribbon, corrugating a portion of said ribbon, leaving a portion of said ribbon plain, rolling said ribbon into the form of a cylinder having the plain portion thereof on the outside and securing the end of said ribbon.

14. The herein described process of producing a food product which consists in shaping the material in the form of a ribbon having roughened surfaces and rolling said ribbon into the desired form, whereby said surfaces will produce interstices between adjacent layers of said ribbon.

In testimony whereof, I affix my signature.

SCOTT H. PERKY.